United States Patent
Benevelli et al.

(10) Patent No.: US 10,827,686 B2
(45) Date of Patent: Nov. 10, 2020

(54) AGRICULTURAL SYSTEM WITH A SQUARE BALER CONTROLLED VIA A CONTINUOUSLY VARIABLE TRANSMISSION

(71) Applicant: CNH Industrial America LLC, New Holland, PA (US)

(72) Inventors: Alessandro Benevelli, Albinea (IT); Jonathan De Fraine, Nazareth (BE)

(73) Assignee: CNH Industrial America LLC, New Holland, PA (US)

( * ) Notice: Subject to any disclaimer, the term of this patent is extended or adjusted under 35 U.S.C. 154(b) by 233 days.

(21) Appl. No.: 15/970,556

(22) Filed: May 3, 2018

(65) Prior Publication Data
US 2018/0317394 A1   Nov. 8, 2018

(30) Foreign Application Priority Data

May 5, 2017   (IT) .......................... 102017000048947

(51) Int. Cl.
| | |
|---|---|
| *A01F 15/08* | (2006.01) |
| *A01F 15/04* | (2006.01) |
| *F16H 37/08* | (2006.01) |
| *A01F 15/10* | (2006.01) |
| *F16H 3/72* | (2006.01) |

(52) U.S. Cl.
CPC ........ *A01F 15/0825* (2013.01); *A01F 15/042* (2013.01); *A01F 15/0841* (2013.01); *F16H 37/0846* (2013.01); *A01F 15/10* (2013.01); *F16H 3/724* (2013.01)

(58) Field of Classification Search
CPC ................ A01F 15/0825; A01F 15/042; A01F 15/0841; A01F 15/10; F16H 37/0846; F16H 37/084; F16H 3/724; F16H 3/725
USPC ...................................... 100/188 R
See application file for complete search history.

(56) References Cited

U.S. PATENT DOCUMENTS

| | | | |
|---|---|---|---|
| 2014/0137757 A1* | 5/2014 | Nelson ................ | A01F 15/0841 100/102 |
| 2015/0234767 A1* | 8/2015 | Tatge .................. | G06F 13/4027 710/306 |
| 2016/0290458 A1* | 10/2016 | Taskiran ............... | F16H 37/084 |

FOREIGN PATENT DOCUMENTS

| | | |
|---|---|---|
| EP | 3078257 A1 | 10/2016 |
| WO | 2016005388 A1 | 1/2016 |
| WO | WO-2016005366 A1 * | 1/2016 ......... A01F 15/0841 |

* cited by examiner

*Primary Examiner* — Shelly M Self
*Assistant Examiner* — Teresa A Guthrie
(74) *Attorney, Agent, or Firm* — Peter Zacharias; Patrick Sheldrake (57) ABSTRACT

An agricultural system includes a baler with a plunger and a sensor for sensing a plunger-related value; a vehicle including a power source operable to convey power to the plunger; and a CVT arranged to drive the plunger. In order to balance a fluctuating load of the plunger over the working cycle, an electronic control unit (ECU) is coupled to the sensor and to the CVT and is configured to receive the signal from the sensor and to cause the CVT to modify a gear ratio of the CVT based on the signal from the sensor and on a mathematical model defining a CVT gear ratio variation profile derived from an expected load applied by crop on the plunger over its operating cycle.

11 Claims, 7 Drawing Sheets

AGRICULTURAL SYSTEM WITH A SQUARE BALER CONTROLLED VIA A CONTINUOUSLY VARIABLE TRANSMISSION

The present invention relates to an agricultural system comprising a vehicle, such as a tractor, and a square baler having a plunger controlled via a continuously variable transmission (CVT).

BACKGROUND OF THE INVENTION

A square baler comprises a reciprocating plunger to compact crop in a compression chamber to form a squared bale. The alternating motion of the plunger is powered by a flywheel, which is in turn connected via a main drive shaft to a power takeoff (PTO) of a tractor. Such drive converts rotary motion of the PTO into reciprocating motion of the plunger and comprises, according to a known layout, a shaft for connection with the PTO, the flywheel driven in rotation by the shaft and a crank arm to connect the flywheel and the plunger via a rod.

Power absorption to move the plunger is pulsating with a peak value in the order, for large balers, of 450 kW. Such pulsating power demand impacts on the traction performance of an IC engine of the tractor by causing a pulsating variation of the tractor's speed. Furthermore, in order to ensure proper functioning on all load conditions, the maximum power of a tractor shall match the peak power absorbed by the baler. This however implies that power of the IC engine is not optimized.

US-A1-2014137757 discloses a square baler with a plunger driven by a CVT. Control of CVT is based on data provided by speed sensors that are quickly processed in order to provide an appropriate speed ratio. The sequence of signal detection, process of the signal and provision of the appropriate speed ratio, i.e. a closed loop control, causes a delay of response, which is undesirable.

The scope of the present invention is to optimize the control of CVT, in particular by providing a control that avoids a delayed response in the control of the CVT.

SUMMARY OF THE INVENTION

In accordance with an aspect of the present invention, there is provided an agricultural system which includes a baler with a plunger and a sensor for sensing a plunger-related value; a vehicle including a power source operable to convey power to the plunger; and a CVT arranged to drive the plunger. In order to balance a fluctuating load of the plunger over a working cycle, an electronic control unit (ECU) is coupled to the sensor and to the CVT and is configured to receive the signal from the sensor and to cause the CVT to modify a gear ratio of the CVT based on the signal from the sensor and on a mathematical model defining a CVT gear ratio variation profile derived from an expected load applied by crop on the plunger over its operating cycle.

BRIEF DESCRIPTION OF THE DRAWINGS

For a better understanding of the present invention, the latter will further be disclosed with reference to the accompanying figures in which.

DETAILED DESCRIPTION OF THE DRAWINGS

Figure 1:
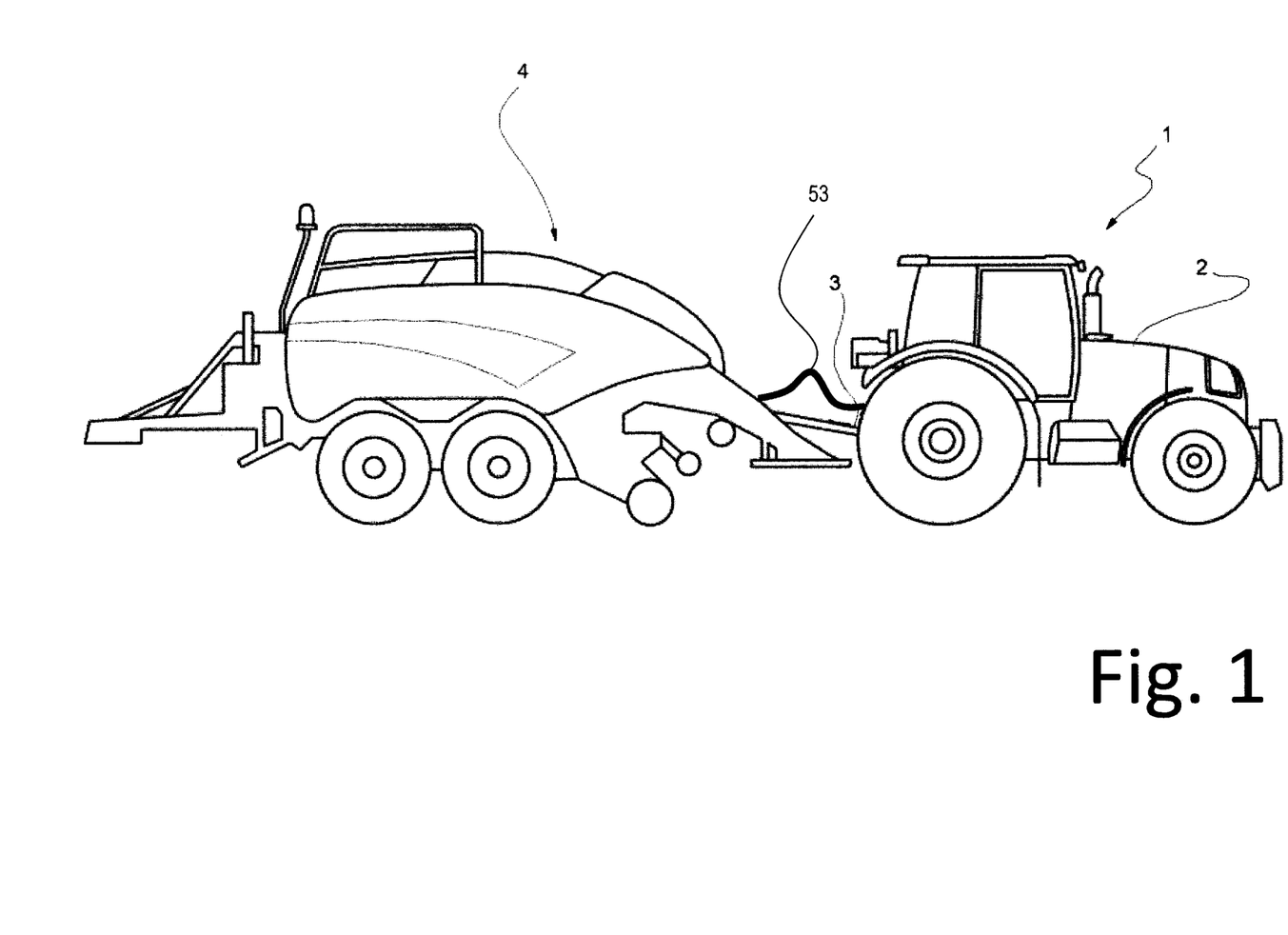
FIG. 1 is a schematic lateral view of an agricultural system comprising a tractor with a square baler and a CVT according to the present invention.

FIG. 1 refers as a whole to an agricultural system comprising a tractor 1 comprising a mechanical power source, i.e. a traction internal combustion (IC) engine 2, and a PTO 3; and a square baler 4 trailed by tractor 1 and coupled in torque transmitting manner to PTO 3.

The agricultural system further comprises an electronic control unit ECU (see FIG. 2) preferably on board of tractor 1, to control actuators and implements attachable to tractor 1 and/or to the PTO on the basis of signals generated by sensors.

Figure 2:
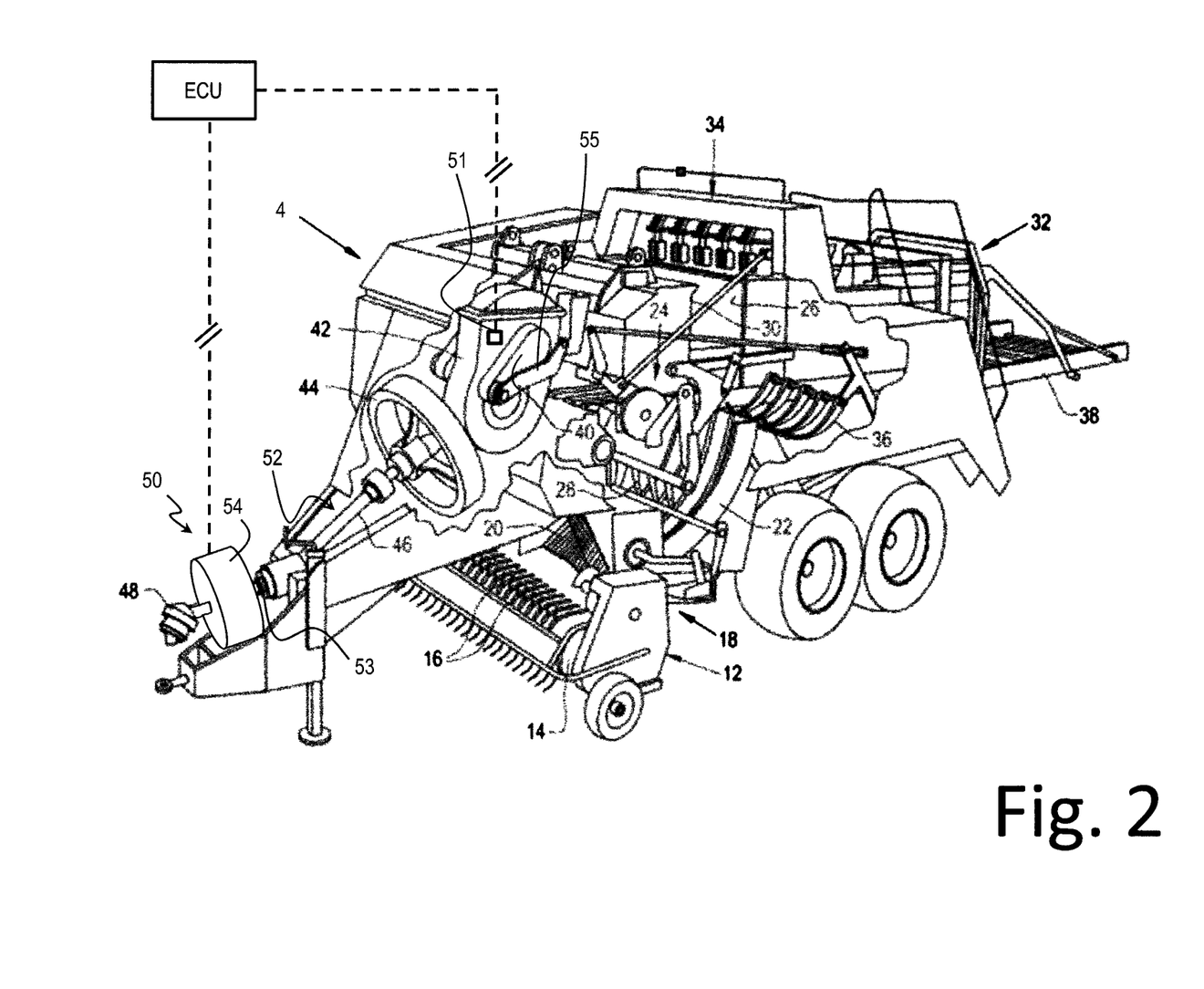
FIG. 2 is a perspective cutaway view of the baler in FIG. 1.

Referring to FIG. 2, there is shown a perspective cutaway view showing the internal workings of baler 4, which may be a large square baler. Baler 4 operates on a two stage feeding system. Crop material is lifted from windrows into baler 4 using a pickup unit 12. Pickup unit 12 includes a rotating pickup roll 14 with tines 16, which move the crop rearward toward a packer unit 18. An optional pair of stub augers (one of which is shown, but not numbered) are positioned above pickup roll 14 to move the crop material laterally inward. Packer unit 18 includes packer tines 20, which push the crop into a pre-compression chamber 22 to form a wad of crop material.

Packer tines 20 intertwine the crop together and pack the crop within the pre-compression chamber 22. Pre-compression chamber 22 and packer tines 20 function as the first stage for crop compression. Once the pressure in pre-compression chamber 22 reaches a predetermined sensed value, a stuffer unit 24 moves the wad of crop from pre-compression chamber 22 to a main bale chamber 26. Stuffer unit 24 includes stuffer forks 28 which thrust the wad of crop directly in front of a plunger 30, which reciprocates within main bale chamber 26 and compresses the wad of crop into a flake.

Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Plunger 30 is connected via a crank 40 with a gearbox 42. Gearbox 42 is driven by a flywheel 44, which in turn is connected via a drive shaft 46 with the PTO coupler 48. The PTO coupler 48 is detachably connected with PTO 3, in particular to a spline of PTO 3 at the rear of tractor 1. Rotating shafts (not shown) of tractor 1, PTO coupler 48, drive shaft 46, flywheel 44 and gearbox 42 together define a driveline 50 which provides power to plunger 30 from IC engine 2. Flywheel 44 has a sufficient mass to carry plunger 30 through a compression stroke as power is applied to drive shaft 46 by PTO 3.

In order to reduce effects of plunger power fluctuations on IC engine 2, a CVT 54 connects in torque transmitting manner IC engine 2 and flywheel 44. CVT 54 may be either on tractor 1, e.g. to connect PTO 3 and IC engine 2, or on baler 4, e.g. to connect PTO coupler 48 to flywheel 44. In an alternative embodiment, not shown, flywheel is not necessary and the kinetic power is stored by rotating components of driveline 50.

In both instances, gear ratio of CVT 54 is controlled by the electronic control unit ECU of the agricultural system on the basis of a mathematical model defining a CVT gear ratio variation profile derived from an expected load applied by the crop on plunger 30 over an operating cycle thereof, and of electric signals by a sensor 51, which monitors a plunger-related value indicating a progression of the operating cycle by plunger 30. Sensor 51 is connected to the control unit via an ISOBUS (ISO 11783) network in order to take advantage of standardization concerning data communication on tractors.

The CVT gear ratio variation profile over the operating cycle is calculated as follows.

Figure 3:
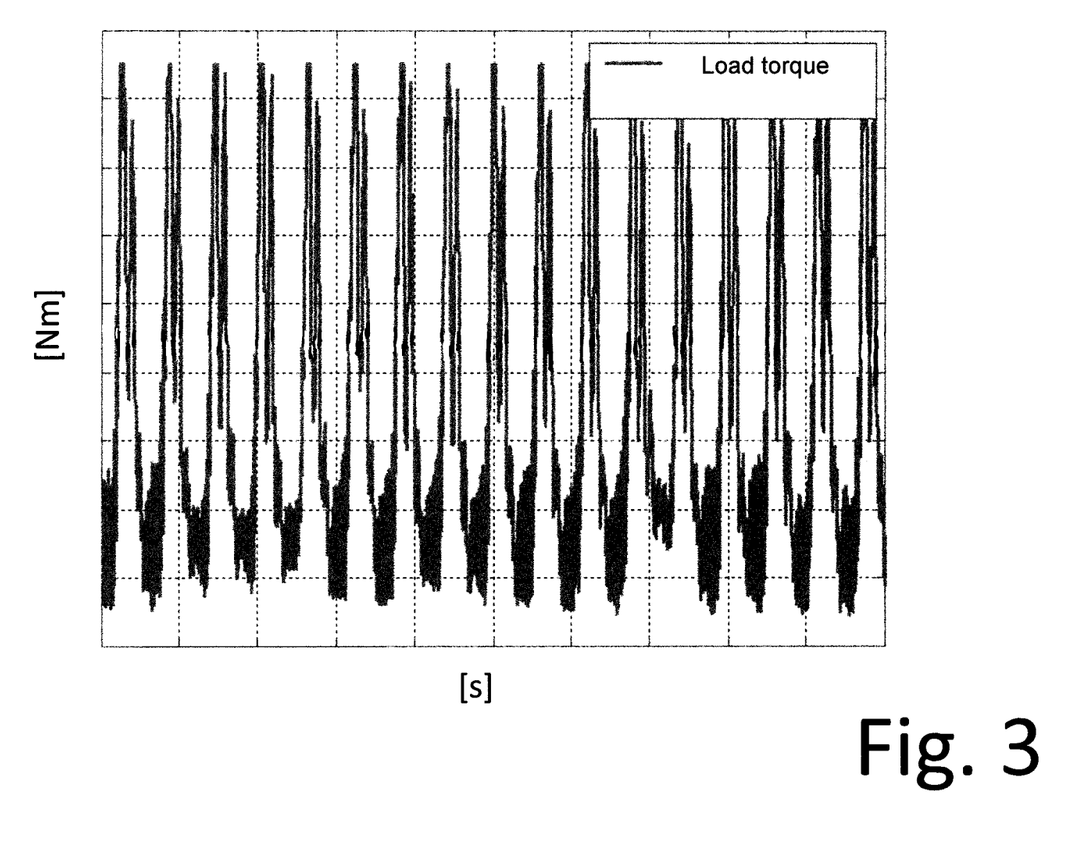
FIG. 3 is an exemplary time history of a load applied to a plunger of the baler in FIG. 1.

FIG. 3 shows an amount of torque that crop applies on a driveline portion 52 connecting an output shaft 53 of CVT to plunger 30 over a period of time. According to the embodiment of FIG. 2, the CVT is located on baler 4 and is indicated by reference number 54. As may be appreciated, action of the crop on plunger 30 is a fluctuation having a substantially regular period corresponding to the operating cycle of plunger 30. The load fluctuation depicted in FIG. 3 is also characterized by load peaks corresponding to the phases where plunger 30 presses the crop to form the bale within bale chamber 26. When plunger 30 retracts from the bale, the load progressively decreases to reach a minimum load. Fluctuation depicted in FIG. 3 is strictly linked to the reciprocating period of plunger 30. During functioning, such period is substantially constant in case the tractor load is substantially constant. Consequently, the CVT gear ratio variation profile remains unchanged over the operating cycles.

The torque-related value may be either measured via a torque sensor applied to drive shaft 46 or via a load cell mounted on a tie rod 55 hinged between crank arm 40 and plunger 30. The sensor detecting the torque related value (not shown) is connected to exchange data with the control unit. According to an alternative, the time history of FIG. 2 is detected during a calibration phase of the agricultural system. The calibration lasts for a few operating cycles of plunger 30. Such calibration phase may be either completed during manufacturing or is completed by the operator on the field e.g. during a measurement phase along a short section of a crop field to be processed by the agricultural system. As an alternative, the torque related time history is processed offline from e.g. statistical information about performances of balers with different types of crops, and is uploaded into the control unit by the manufacturer.

In all instances, time history is the basis for defining the CVT gear ratio variation profile over the operating cycle of plunger 30 such to provide a counterbalancing action by an inertial power of driveline portion 52 and plunger 30. The CVT gear ratio variation profile is calculated, for example, by imposing that a balancing power history has a mirrored profile of an expected power time history applied by crop on plunger 30. Such balancing power history is a kinetic or inertial power history obtained by suitably accelerating/decelerating driveline portion 52, in particular flywheel 44. The moment of inertia of rotating elements of driveline portion 52 and the masses of reciprocating elements, such as tie rod 55 and plunger 30 are known. It is therefore possible to compute a gear ratio variation profile history such to obtain the desired inertial or kinetic power history. Then, the gear ratio variation profile history is adapted to the plunger-related value measured by sensor 51 over the plunger operating cycle, i.e. longitudinal position, angular position, torque, load etc. Finally, the control unit actuates CVT 54 to change the speed ratio over the operating cycle on the basis of signals from sensor 51 and the corresponding gear ratio variation profile.

Figure 4A:
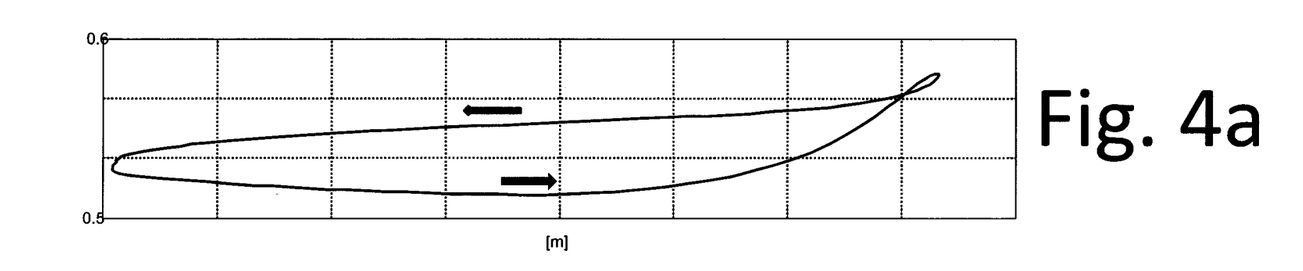
FIG. 4a shows a map of the CVT speed ratio over an operating cycle of the plunger.

FIG. 4a shows that CVT gear ratio substantially increases during compression of the crop, i.e. bottom arrow—right half of the map, and decreases during retraction of plunger 30, i.e. top arrow—left half of the map.

Figure 4B:
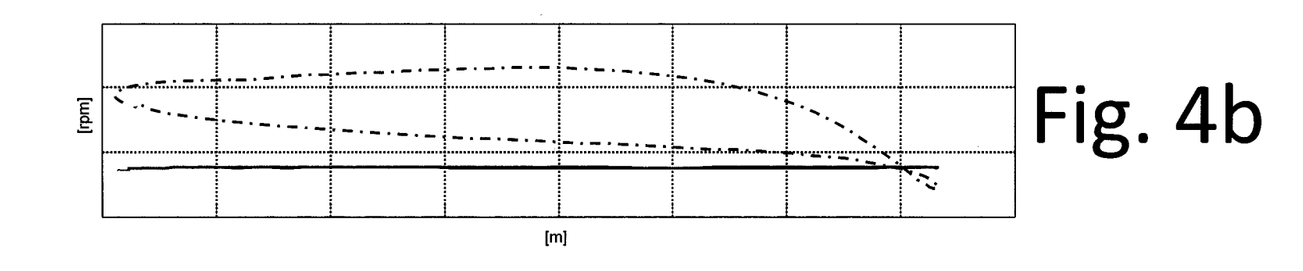
FIG. 4b shows a map of flywheel and engine angular speed over the operating cycle of the plunger.

FIG. 4b shows in a dash-dotted line a corresponding flywheel speed profile stored in the control unit in order to counterbalance the energy/power derivable by the expected time-history of FIG. 3. As flywheel 44 is connected to output shaft 53, such two components share the same speed profile. The continuous line refers to an input shaft of CVT 54, e.g. PTO coupler 48 in the embodiment of FIG. 2. Such line shows that, when applying the CVT gear ratio variation profile of the invention, PTO coupler speed variation over the operating cycle of plunger 30 is substantially negligible and IC engine 2 runs smoothly despite the fluctuating load applied on plunger 30 by the crop. In order to obtain such effect, the inertial power stored by driveline 50 shall have a fluctuating profile similar to that of the estimated power applied on plunger 30 by the crop and have a phase such to interfere with the estimated power applied to plunger 30 so as to decrease or substantially cancel the fluctuation caused by crop compression. Electric signals of sensor 51 provide control unit ECU with information about such a phase because sensor 51 monitors plunger 30 or driveline portion 52 during the operating cycle and, on the basis of such monitoring, control unit ECU adjusts the phase of CVT gear ratio variation profile and thus, ultimately, the phase of inertial or kinematic power stored by driveline 50. For example, CVT gear ratio variation profile has a starting point and the control unit re-starts the variation profile from the starting point for each operating cycle of the plunger in order to provide the counterbalance effect.

In FIG. 4b, the rotational speed profiles are plotted over the longitudinal position of plunger 30 during the operating cycle. The plot of FIG. 4b is obtained when sensor 51 is a position sensor and the control unit adjusts the phase of CVT gear ratio variation profile so that the inertial power profile of driveline portion 52 and plunger 30 counterbalances the estimated load power applied on plunger 30 by the crop.

Figure 4C:
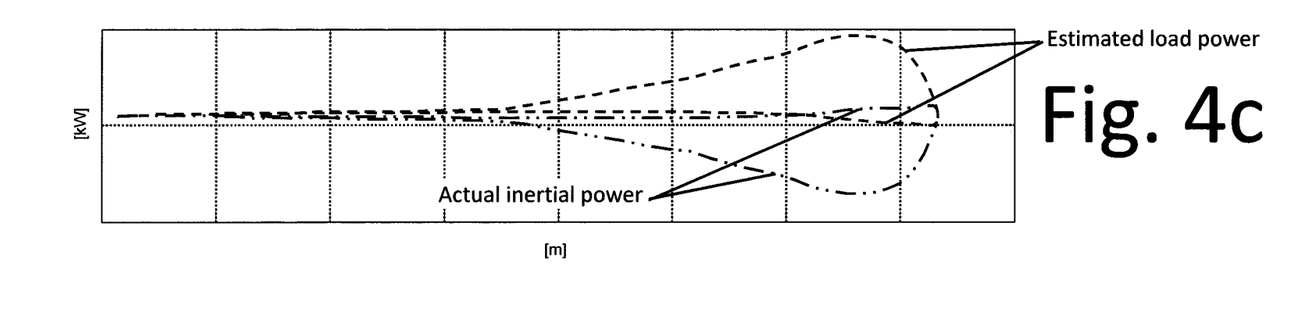
FIG. 4c shows a map of plunger load and flywheel kinetic power over the operating cycle of the plunger.

FIG. 4c shows an example of the above mentioned counterbalancing action in the case where the phase between the estimated load power (dashed line) and the actual inertial power of driveline portion 52 and plunger 30 (dash dotdotted lined) is zero. The two power profiles are mirroring one another so that the resulting power is constant. Consistently with FIG. 4a, also in FIG. 4b the powers are plotted over the longitudinal position of plunger 30 during an operating cycle in order to provide information to the control unit for adjusting the phase of the CVT gear ratio variation profile.

Figure 5:
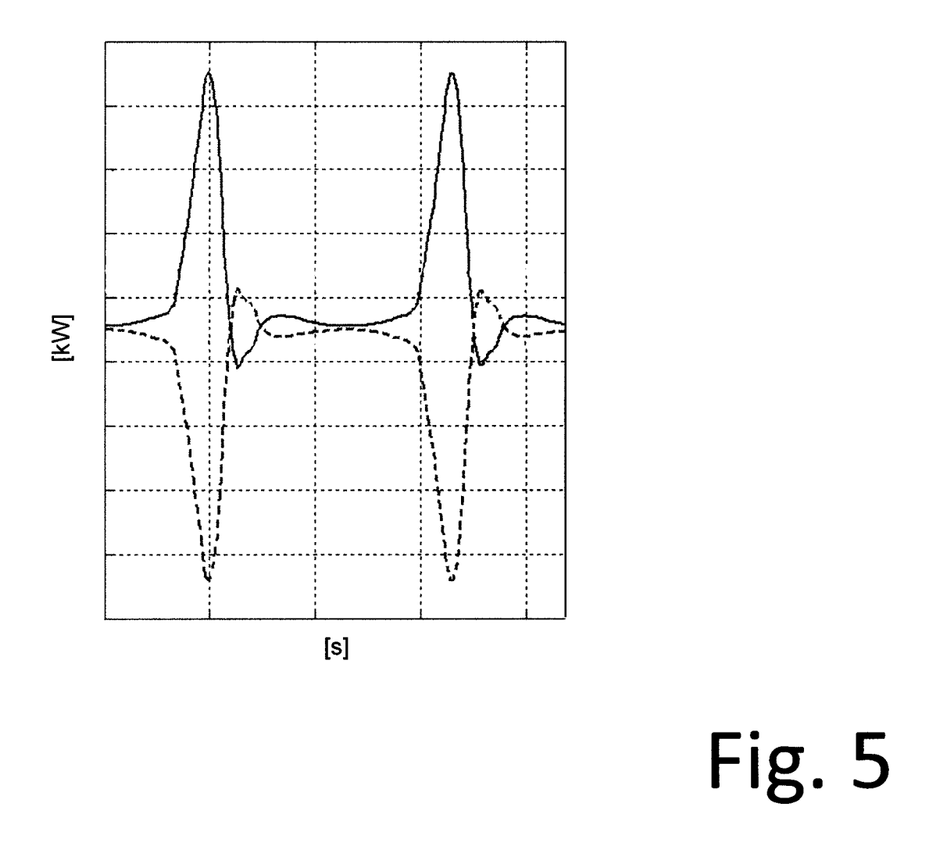
FIG. 5 shows a power balance of expected power on the plunger by the crop and kinematic or inertial power of a driveline portion.

FIG. 5 shows a time conversion of the balancing action between kinetic or inertial power (dashed line) and expected load (solid line) applied by the crop on plunger 30. Due to electric signals from sensor 51, the inertial or kinetic power is phased with the expected load from crop so as to obtain an overall balanced action on IC engine 2. Such balanced action is a substantially constant power that is higher than a mean of a fluctuating power that loads IC engine when gear ratio of driveline 50 is constant, and lower than peaks of such a fluctuating power. The higher and constant mean power absorbed by a system according to the present invention is due to the extra-acceleration of driveline portion 52 to provide counterbalancing power. Such power is substantially constant and this is advantageous because it is possible for a tractor with IC engine 2 having a nominal maximum power to drive square balers having a maximum peak power, i.e. maximum power derivable from FIG. 3, higher than the nominal maximum power of IC engine 2.

Figure 6A:
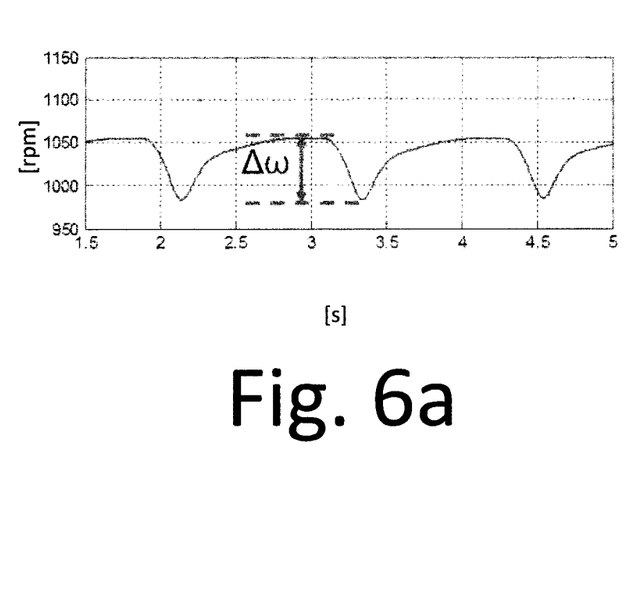
FIGS. 6a and 6b show a comparison between speed variation where speed ratio is constant and where the CVT is controlled according to the present invention.
Figure 6B:
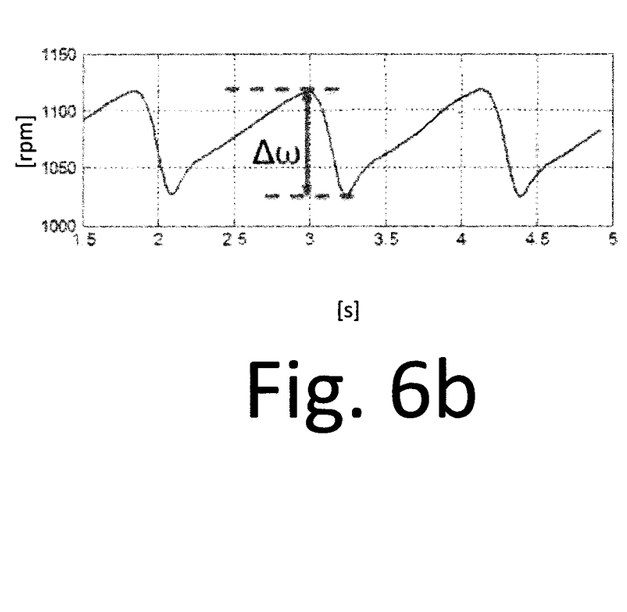

FIG. 6 shows a comparison between the rotational speed variation of drive shaft 46 when gearbox 42 is coupled to IC engine 2 with a fixed gear ratio (FIG. 6a) and when CVT 54 is controlled by the control unit according to the invention (FIG. 6b), given the same expected load on plunger 30.

In case of a fixed gear ratio connection between IC engine 2 and gearbox 42, the load applied on plunger 30 by the crop caused a certain level of angular speed fluctuation transmitted to IC engine 2. According to the present invention, the CVT gear ratio profile stored in the control unit provides an increased angular speed fluctuation with respect to a fixed ratio case (FIG. 6b). Such increase provides for an additional inertial power of the driveline portion 52 and plunger 30 that substantially compensates the fluctuation of the load applied by the crop.

Figure 7:
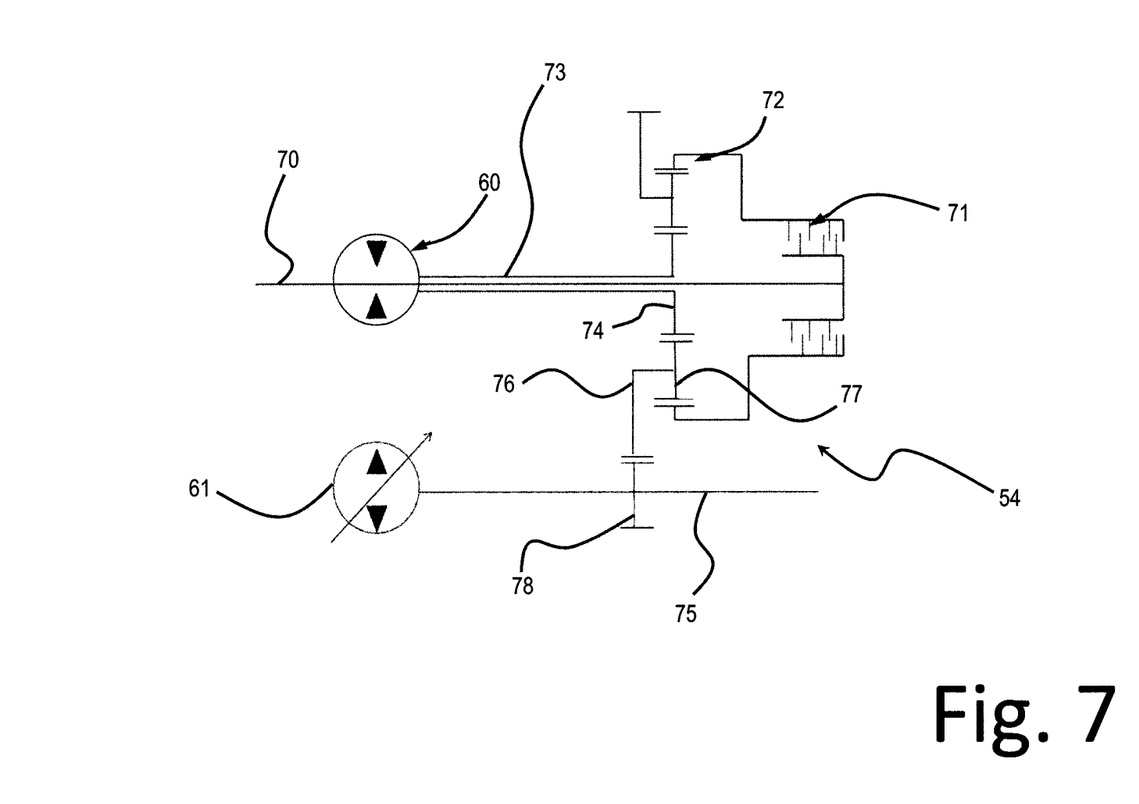
FIG. 7 shows a schematic view of a preferred embodiment of the CVT.

FIG. 7 discloses a preferred embodiment of CVT 54, i.e. a planetary CVT actuated by a combination of a hydraulic pump 60 and a motor 61, which can be either a hydraulic motor or an electric motor. Furthermore, the specific embodiment of FIG. 7 provides an example where CVT 54 is provided on tractor 1 and not on baler 4, as depicted in FIG. 2. Pump 60 is connected to motor 61 by means of an input line and of an output line, which are not shown. An operating fluid can be sent from pump 60 to motor 61, or vice versa, respectively through the input line and the output line. Furthermore, pump 60 and motor 61 can be capable of working in a reversible manner. Hence, pump 60 and motor 61 can be practically interchangeable.

In the embodiment shown, CVT 54 is a kinematic speed change gear and, in the embodiment shown in FIG. 7, pump 60 and motor 61 are designed to have a power sufficient to implement the speed variation profile stored in the control unit. Preferably, the power of pump 60 and motor 61 is negligible with respect to the power of baler 4 and/or IC engine 2. This ensures that the CVT is compact and, at the same time, able to operate in order to obtain the counterbalance effect discussed above. Actuation of CVT 54 may also be operated via the combination of an electric motor and an electric generator or by a combination of hydraulic and electric actuation.

With particular reference to FIG. 7, a first input shaft 70 driven by IC engine 2 can be coupled to CVT 54 by means of a clutch 71. In particular, the first input shaft 70 can also be coupled to an annular gear 72 of planetary gear 54.

Furthermore, a second input shaft 73 is connected between motor 61 and a sun gear 74 of the planetary gear 54. In addition, a shaft 75 has a portion coupled to pump 60 and a portion coupled to a spline of PTO 3. Shaft 75 allows PTO 3 to be connected to CVT 54. To this end, a carrier 76 is coupled to annular gear 72 and sun gear 74 by satellites 77 and meshes with a gear wheel 78 of shaft 75. According to a preferred embodiment, shaft 75 comprises the spline of PTO 3.

According to an alternative embodiment, hydraulic motor actuating CVT 54 is connected to a hydraulic circuit of tractor 1 in order to provide additional power to that from input shaft 70 for accelerating flywheel 44.

The advantages of the agricultural system according to the present invention are as follows.

The incorporation of the profile in FIG. 4a into the control unit and correlation with the electric signals from sensor 51 to adjust the phase, e.g. the start, of CVT speed ratio variation profile for each operating cycle provides for a prompt and easy match of inertial or kinetic power fluctuations of driveline portion 52, in particular of flywheel 44, and the power fluctuation derived from expected load on plunger 30 by the crop.

Even in case the actual load elaborated by baler 4 is different from the expected load, the resultant fluctuation transferred to IC engine 2 would have a relatively low amplitude and, therefore, would have a better impact on traction power of tractor 1.

Furthermore, due to lowering of power peaks by the action of driveline 50, it is possible to attach a larger baler to a given tractor.

The invention is not limited to the embodiments described in the previous paragraphs.

For example, in the discipline of rotor dynamics it is known to calculate an equivalent moment of inertia of a crank mechanism that takes into account both the moments of inertia of the rotating components and the moments of inertia of the reciprocating components. This provides a single moment of inertia that is variable depending on the angular position of crank arm 40. When squared baler are large and such to process a high power, i.e. 450 kW of peak power applied by crop on plunger 30, flywheel 44 has a mass such that the inertial contributions of other components of the drive may be neglected and the moment of inertia of the drive is approximated by the moment of inertia of flywheel 44. When a square baler has a mid-low power, the action of CVT 54 may be such to reduce the mass of flywheel up to dispensing the presence of a dedicated standard flywheel, i.e. a disk-shaped flywheel, and provide a counterbalancing action based on rotating and reciprocating masses of driveline portion 52 and plunger 30.

Furthermore, other quantities may be used as plunger-related quantities to provide information to the control unit for adjusting the phase of the CVT gear ratio variation profile. For example, an angular position of e.g. crank arm 40 or another rotating element in driveline portion 52 having a fixed gear ratio with crank arm 40; or a load applied on tie rod 55, which fluctuates and therefore gives an indication of the level of completion of the plunger operating cycle; or a torque applied to a rotating element of driveline portion 52 and providing similar information to those already discussed for the force applied to tie rod 55.

Sensor 51 may either provide a history over the operating cycle of plunger 30 or simply provide a few discrete points up to one significant point over each working cycle in order to adjust the phase of the CVT gear ratio variation profile. For example, sensor 51 may detect one of plunger's dead centres for each operating cycle. In particular, when sensor 51 detects the dead centre in which plunger 30 is distal from the bale, the control unit triggers the start of the CVT gear ratio variation profile, which counterbalances the expected load applied by crop in the assumption that the frequency of plunger 30 is constant during the operating cycle. This in particular works where the period of the operating cycle is constant over the functioning conditions, e.g. where crop quantity and density are substantially constant.

According to an aspect of the invention, control unit matches signals by sensor 51 with the CVT gear ratio variation profile. Such profile may be provided in a library of data stored in the control unit e.g. during manufacturing and/or during software update of the control unit. The library comprises different CVT gear ratio variation profiles depending on weather factors and/or crop factors. Weather factor comprise at least a level of humidity and/or dry weather or rainy weather. Crop factors comprise an identification of the crop. The library is accessible by an operator sitting on tractor 1 via a user interface: the operator selects the load map that best suits the conditions during functioning of baler 4.

According to a not-shown embodiment, a CVT according to FIG. 7 may also be provided on baler 4.

What is claimed is:

1. An agricultural system comprising:
    a baler comprising:
        a plunger operable to process a value of crop material and having an operating cycle; and
        a sensor for sensing a plunger-related value indicating a progression of the operating cycle and configured to output a signal;
    a vehicle comprising a power source operable to convey power to the plunger;
    a continuously variable transmission (CVT) arranged to drive the plunger and driven by the power source; and
    an electronic control unit coupled to the sensor and to the CVT and configured to:
        receive the signal from the sensor; and
        cause the CVT to modify a gear ratio of the CVT based on the signal from the sensor and on a mathematical model defining a CVT gear ratio variation profile derived from an expected load applied by the crop on the plunger over the operating cycle, the expected load comprising an increase when the plunger presses the crop and a decrease when the plunger retracts, so as to result in a change in the CVT gear ratio to such an extent as to compensate for a peak of the expected load,
    wherein the electronic control unit is further configured to:
        receive a time history of the expected load during a calibration phase, and
        adjust the CVT gear ratio variation profile.

2. The system according to claim 1, wherein CVT gear ratio variation profile has a starting point and the electronic control unit re-starts the variation profile from the starting point for each operating cycle.

3. The system according to claim 1, wherein the gear ratio variation profile is unchanged when a speed of the vehicle is constant.

4. The system according to claim 1, wherein the electronic control unit and the sensor are coupled via an ISOBUS on-board communication network.

5. The system according to claim 1, wherein the sensor measures a position of the plunger.

6. The system according to claim 1, wherein the power source is an internal combustion (IC) engine having a nominal power and the baler has a maximum peak power, the maximum peak power being higher than the nominal power.

7. The system according to claim 1, wherein the electronic control unit stores a library of CVT gear ratio variation profiles, and wherein the agricultural system further comprises a user-interface configured for receiving a selection of a preferred profile.

8. The system according to claim 1, wherein an output shaft of the CVT is connected to the plunger via a flywheel.

9. The system according to claim 1, wherein the CVT is a planetary gear.

10. A vehicle comprising:
    a power source operable to convey power to a plunger of a baler having an operating cycle;
    a continuously variable transmission (CVT) arranged to drive the plunger and receive power by the power source; and
    an electronic control unit coupled to the CVT and configured to:
        be coupled to a sensor of the baler;
        receive a signal from the sensor indicating a plunger-related value about a progression of the operating cycle; and
        cause the CVT to modify a gear ratio of the CVT based on the signal from the sensor and on a mathematical model defining CVT gear ratio variation profile from an expected load applied by crop on the plunger over the operating cycle, the expected load comprising an increase when the plunger presses the crop and a decrease when the plunger retracts, so as to result in a change in the CVT gear ratio of such an extent as to compensate for a peak of the expected load,
    wherein the electronic control unit is further configured to:
        receive a time history of the expected load during a calibration phase, and
        adjust the CVT gear ratio variation profile.

11. The vehicle according to claim 10, wherein the vehicle is a tractor.

* * * * *